US010621972B2

(12) United States Patent
Li et al.

(10) Patent No.: US 10,621,972 B2
(45) Date of Patent: Apr. 14, 2020

(54) METHOD AND DEVICE EXTRACTING ACOUSTIC FEATURE BASED ON CONVOLUTION NEURAL NETWORK AND TERMINAL DEVICE

(71) Applicant: BAIDU ONLINE NETWORK TECHNOLOGY (BEIJING) CO., LTD., Beijing (CN)

(72) Inventors: Chao Li, Beijing (CN); Xiangang Li, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 170 days.

(21) Appl. No.: 15/914,066

(22) Filed: Mar. 7, 2018

(65) Prior Publication Data
US 2018/0277097 A1    Sep. 27, 2018

(30) Foreign Application Priority Data

Mar. 21, 2017    (CN) .......................... 2017 1 0172622

(51) Int. Cl.
G10L 15/02    (2006.01)
G10L 25/18    (2013.01)
G10L 15/22    (2006.01)
G10L 15/16    (2006.01)

(52) U.S. Cl.
CPC .............. *G10L 15/02* (2013.01); *G10L 15/16* (2013.01); *G10L 15/22* (2013.01); *G10L 25/18* (2013.01)

(58) Field of Classification Search
CPC ......... G10L 15/02; G10L 15/16; G10L 15/22; G10L 25/18
See application file for complete search history.

(56) References Cited

U.S. PATENT DOCUMENTS

| 10,440,180 | B1* | 10/2019 | Jayapalan | G06N 5/04 |
| 2016/0099010 | A1* | 4/2016 | Sainath | G10L 25/30 |
| | | | | 704/232 |
| 2018/0197098 | A1* | 7/2018 | Subbian | G06N 7/005 |
| 2018/0218242 | A1* | 8/2018 | Sekine | G06K 9/4628 |
| 2018/0218502 | A1* | 8/2018 | Golden | G06T 7/10 |
| 2019/0005976 | A1* | 1/2019 | Peleg | G10L 21/0216 |

FOREIGN PATENT DOCUMENTS

| CN | 106128465 A | * 11/2016 | |
| CN | 106710589 A | * 5/2017 | G06K 9/6274 |

OTHER PUBLICATIONS

Wang, "Research on Audio Feature Extraction and Context Recognition Based on Deep Neural Networks," Dissertation for the Master Degree in Engineering, Harbin Institute of Technology, Jul. 2015, 56 pages.
SIPO, First Office Action for CN Application No. 201710172622, dated Apr. 8, 2019.

* cited by examiner

*Primary Examiner* — Mohammad K Islam
(74) *Attorney, Agent, or Firm* — Hodgson Russ LLP

(57) ABSTRACT

The present disclosure provides a method and a device for extracting an acoustic feature based on a convolution neural network and a terminal device. The method includes: arranging speech to be recognized into a speech spectrogram with a predetermined dimension number; and recognizing the speech spectrogram with the predetermined dimension number by the convolution neural network to obtain the acoustic feature of the speech to be recognized.

5 Claims, 9 Drawing Sheets speech to be recognized is arranged into a speech spectrogram with a predetermined dimension number ⟋–101 a model of the residual network structure of the convolution neural network is configured ⟋–401 speech spectrogram with the predetermined dimension number is recognized by a residual network structure of the convolution neural network to obtain the acoustic feature of the speech to be recognized ⟋–301

Fig. 4

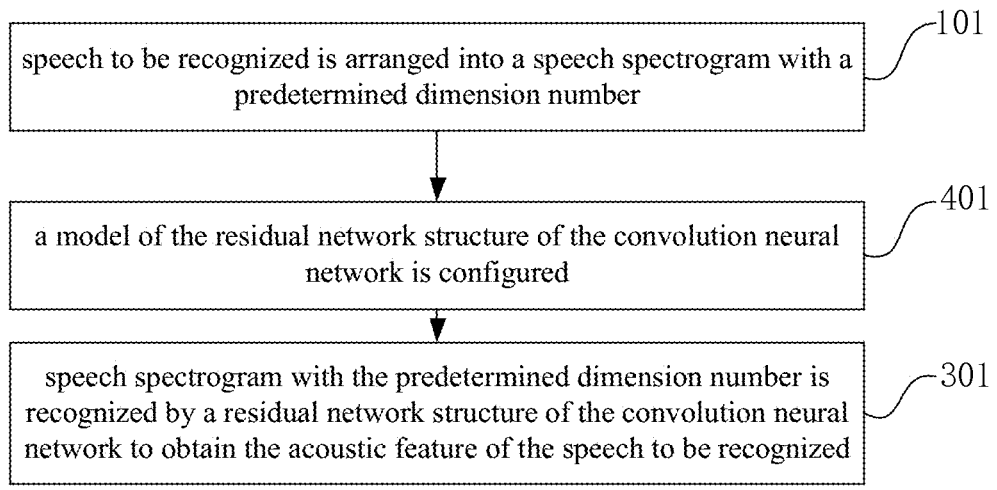

Fig. 5 speech to be recognized is arranged into a speech spectrogram with a predetermined dimension number — 101 speech spectrogram with the predetermined dimension number is recognized by a jump link structure of the convolution neural network — 1001

METHOD AND DEVICE EXTRACTING ACOUSTIC FEATURE BASED ON CONVOLUTION NEURAL NETWORK AND TERMINAL DEVICE

This application claims priority to and benefits of Chinese Patent Application Serial No. 201710172622.6, filed with the State Intellectual Property Office of P. R. China on Mar. 21, 2017, the entire content of which is incorporated herein by reference.

FIELD

The present disclosure relates to speech recognition technology field, and more particularly, to a method and a device for extracting an acoustic feature based on a convolution neural network and a terminal device.

BACKGROUND

With a popularity of speech search service, more and more users begin to use speech to search for information, and a proportion of speech search is increasing year by year. In order to improve an accuracy of speech recognition, various deep learning methods have been introduced into speech recognition field, and the accuracy of speech recognition has gradually increased.

In the related art, an acoustic feature is mainly extracted through a local weight share convolution layer. However, this method cannot characterize the acoustic feature of the speech well, and the accuracy of speech recognition is low.

SUMMARY

Embodiments of the present disclosure seek to solve at least one of the problems existing in the related art to at least some extent.

A first objective of the present disclosure is to provide a method for extracting an acoustic feature based on a convolution neural network, which extracts the acoustic feature of speech by the convolution neural network, thereby characterizing the acoustic feature of the speech well, and improving an accuracy of speech recognition.

A second objective of the present disclosure is to provide a device for extracting an acoustic feature based on a convolution neural network.

A third objective of the present disclosure is to provide a terminal device.

A fourth objective of the present disclosure is to provide a storage medium including computer executable instructions.

In order to achieve the above object, the method for extracting the acoustic feature based on the convolution neural network according to the first aspect of embodiments of the present disclosure includes: arranging speech to be recognized into a speech spectrogram with a predetermined dimension number; and recognizing the speech spectrogram with the predetermined dimension number by the convolution neural network to obtain the acoustic feature of the speech to be recognized.

In the method for extracting the acoustic feature based on the convolution neural network according to embodiments of the present disclosure, the speech to be recognized is arranged into the speech spectrogram with the predetermined dimension number, and then the speech spectrogram with the predetermined dimension number is recognized by the convolution neural network to obtain the acoustic feature of the speech to be recognized, thereby realizing extracting the acoustic feature of the speech by the convolution neural network, characterizing the acoustic feature of the speech well, and improving an accuracy of speech recognition.

In order to achieve the above objective, the device for extracting the acoustic feature based on the convolution neural network according to the second aspect of embodiments of the present disclosure includes: a generating module, configured to arrange speech to be recognized into a speech spectrogram with a predetermined dimension number; and a recognizing module, configured to recognize the speech spectrogram with the predetermined dimension number by the convolution neural network to obtain the acoustic feature of the speech to be recognized.

In the device for extracting the acoustic feature based on the convolution neural network according to embodiments of the present disclosure, the generating module arranges the speech to be recognized into the speech spectrogram with the predetermined dimension number, and then the recognizing module recognizes the speech spectrogram with the predetermined dimension number by the convolution neural network to obtain the acoustic feature of the speech to be recognized, thereby realizing extracting the acoustic feature of the speech by the convolution neural network, characterizing the acoustic feature of the speech well, and improving an accuracy of speech recognition.

In order to achieve the above objective, the terminal device according to the third aspect of embodiments of the present disclosure includes: one or more processors; a storage device, configured to store one or more programs that, when executed by the one or more processors, cause the one or more processors to perform the method described above.

In order to achieve the above objective, according to the fourth aspect of embodiments of the present disclosure, there is provided a storage medium including computer executable instructions. The computer executable instructions are configured to perform the method described above when executed by a computer processor.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which:

FIG. 4 is a flow chart of a method for extracting an acoustic feature based on a convolution neural network according to yet another embodiment of the present disclosure;

FIG. 5 is a schematic diagram of a configuration of a model of a residual network structure in a method for extracting an acoustic feature based on a convolution neural network according to an embodiment of the present disclosure;

DETAILED DESCRIPTION

Figure 1:
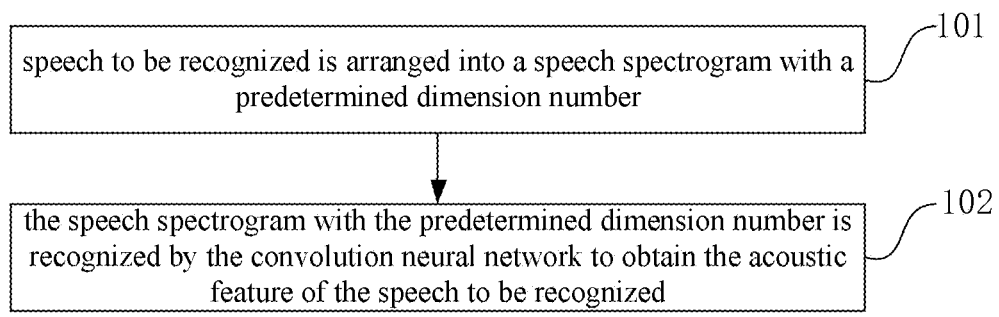
FIG. 1 is a flow chart of a method for extracting an acoustic feature based on a convolution neural network according to an embodiment of the present disclosure.

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure. In contrast, the present disclosure may include alternatives, modifications and equivalents within the spirit and scope of the appended claims.

FIG. 1 is a flow chart of a method for extracting an acoustic feature based on a convolution neural network according to an embodiment of the present disclosure. As illustrated in FIG. 1, the method for extracting the acoustic feature based on the convolution neural network can include block 101 and block 102.

In block 101, speech to be recognized is arranged into a speech spectrogram with a predetermined dimension number.

Specifically, a predetermined multidimensional feature vector can be extracted from the speech to be recognized every predetermined time interval, such that the speech to be recognized is arranged into the speech spectrogram with the predetermined dimension number.

The predetermined dimension number, the predetermined multidimensional value and the predetermined time interval may be set automatically according to an implementation requirement and/or a system performance in a specific implementation, and may not be limited in embodiments of the present disclosure.

Figure 2:
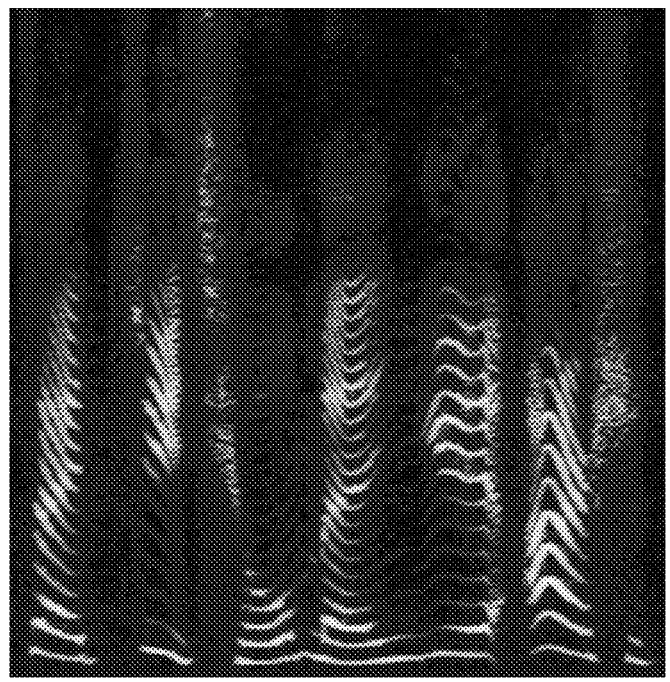
FIG. 2 is a schematic diagram of a speech spectrogram in a method for extracting an acoustic feature based on a convolution neural network according to an embodiment of the present disclosure.

For example, in order to use a 2 dimension convolution operation, the speech to be recognized is arranged into a 2 dimension image format first. Take a 40-dimensional filter bank feature (which is commonly used in the speech recognition) as an example, a 40-dimensional feature vector is extracted every 10 ms, and then the speech to be recognized can be arranged into the speech spectrogram, as illustrated in FIG. 2, which is a schematic diagram of a speech spectrogram in a method for extracting an acoustic feature based on a convolution neural network according to an embodiment of the present disclosure. In FIG. 2, a lateral axis represents time, and a vertical axis represents frequency point.

In this embodiment, the predetermined dimension number is 2, the predetermined multidimensional value is 40, and the predetermined time interval is 10 ms.

In block 102, the speech spectrogram with the predetermined dimension number is recognized by the convolution neural network to obtain the acoustic feature of the speech to be recognized.

In the method for extracting the acoustic feature based on the convolution neural network, the speech to be recognized is arranged into the speech spectrogram with the predetermined dimension number, and then the speech spectrogram with the predetermined dimension number is recognized by the convolution neural network to obtain the acoustic feature of the speech to be recognized, thereby realizing extracting the acoustic feature of the speech by the convolution neural network, characterizing the acoustic feature of the speech well, and improving an accuracy of speech recognition.

Figure 3:
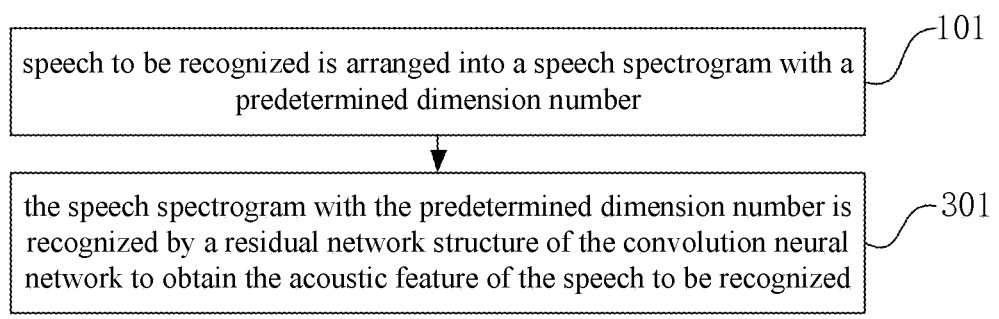
FIG. 3 is a flow chart of a method for extracting an acoustic feature based on a convolution neural network according to another embodiment of the present disclosure.

FIG. 3 is a flow chart of a method for extracting an acoustic feature based on a convolution neural network according to another embodiment of the present disclosure. As illustrated in FIG. 3, in an embodiment illustrated in FIG. 1, the block 102 can be implemented as block 301.

In block 301, the speech spectrogram with the predetermined dimension number is recognized by a residual network structure of the convolution neural network to obtain the acoustic feature of the speech to be recognized.

FIG. 4 is a flow chart of a method for extracting an acoustic feature based on a convolution neural network according to yet another embodiment of the present disclosure. As illustrated in FIG. 4, in an embodiment illustrated in FIG. 3, before the block 301, the method further includes block 401.

In block 401, a model of the residual network structure of the convolution neural network is configured.

In this embodiment, a configuration of the model of the residual network structure of the convolution neural network can be as illustrated in FIG. 5. FIG. 5 is a schematic diagram of a configuration of a model of a residual network structure in a method for extracting an acoustic feature based on a convolution neural network according to an embodiment of the present disclosure.

Specifically, for a 64-channel filter block consisting of a convolution directed acycline graph (DAG for short) of a 64-channel filter bank (filters=64), a down-sampling is performed by a pooling layer both in a time domain and in a frequency domain.

For a 128-channel filter block consisting of a convolution DAG of a 128-channel filter bank (filters=128), the down-sampling is performed by the pooling layer both in the time domain and in the frequency domain.

For a 256-channel filter block consisting of a convolution DAG of a 256-channel filter bank (filters=256), the down-sampling is performed by the pooling layer in the frequency domain.

For a 512-channel filter block consisting of a convolution DAG of a 512-channel filter bank (filters=512), the down-sampling is performed by the pooling layer in the frequency domain.

In this embodiment, the down-sampling performed by the pooling layer in the time domain is ½ down sampling, and the down-sampling performed by the pooling layer in the frequency domain is also ½ down sampling.

Figure 6:
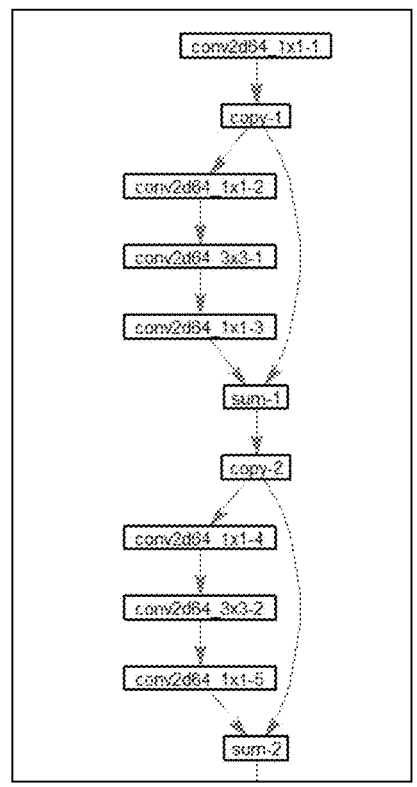
FIG. 6 is a schematic diagram of a 64-channel filter block in a method for extracting an acoustic feature based on a convolution neural network according to an embodiment of the present disclosure.

FIG. 6 is a schematic diagram of a 64-channel filter block in a method for extracting an acoustic feature based on a convolution neural network according to an embodiment of the present disclosure. In FIG. 6, "copy" means copying an input into several copies, and "sum" means summing the input together.

Conv2d64_1×1 is a convolution layer with kernelsize=1×1 and filters=64, and Conv2d64_3×3 is a convolution layer with kernalsize=3×3 and filters=64, in which, kernalsize is a convolution kernel, filters are the filter banks.

Figure 7:
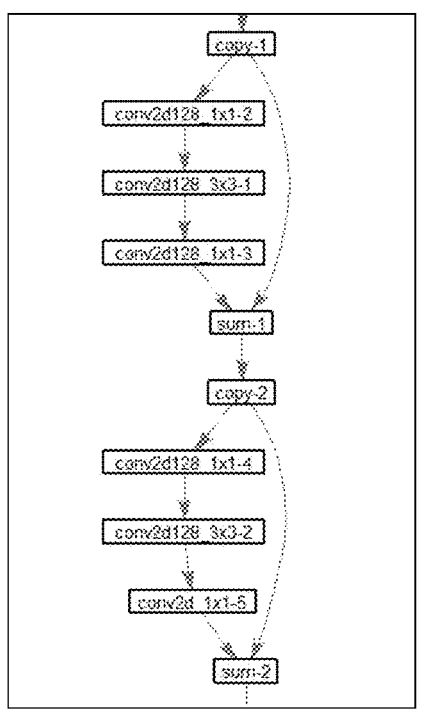
FIG. 7 is a schematic diagram of a 128-channel filter block in a method for extracting an acoustic feature based on a convolution neural network according to an embodiment of the present disclosure.

FIG. 7 is a schematic diagram of a 128-channel filter block in a method for extracting an acoustic feature based on a convolution neural network according to an embodiment of the present disclosure. In FIG. 7, "copy" means copying an input into several copies, and "sum" means summing the input together.

Conv128_1×1 is a convolution layer with kernelsize=1×1 and filters=128, and Conv128_3×3 is a convolution layer with kernalsize=3×3 and filters=128.

Figure 8:
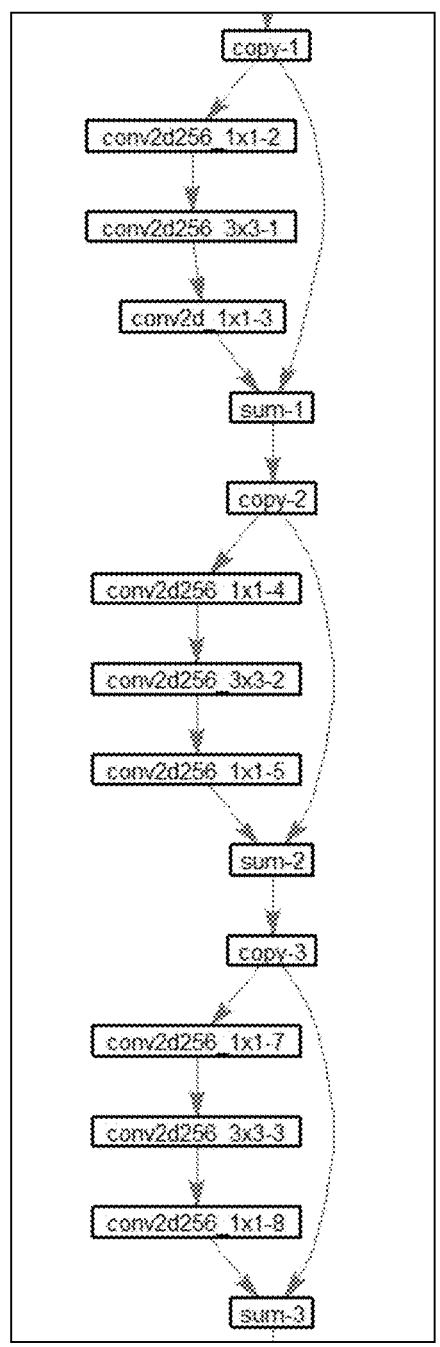
FIG. 8 is a schematic diagram of a 256-channel filter block in a method for extracting an acoustic feature based on a convolution neural network according to an embodiment of the present disclosure.

FIG. 8 is a schematic diagram of a 256-channel filter block in a method for extracting an acoustic feature based on a convolution neural network according to an embodiment of the present disclosure. In FIG. 8, "copy" means copying an input into several copies, and "sum" means summing the input together.

Conv256_1×1 is a convolution layer with kernelsize=1×1 and filters=256, and Conv256_3×3 is a convolution layer with kernalsize=3×3 and filters=256.

Figures 9, 10:
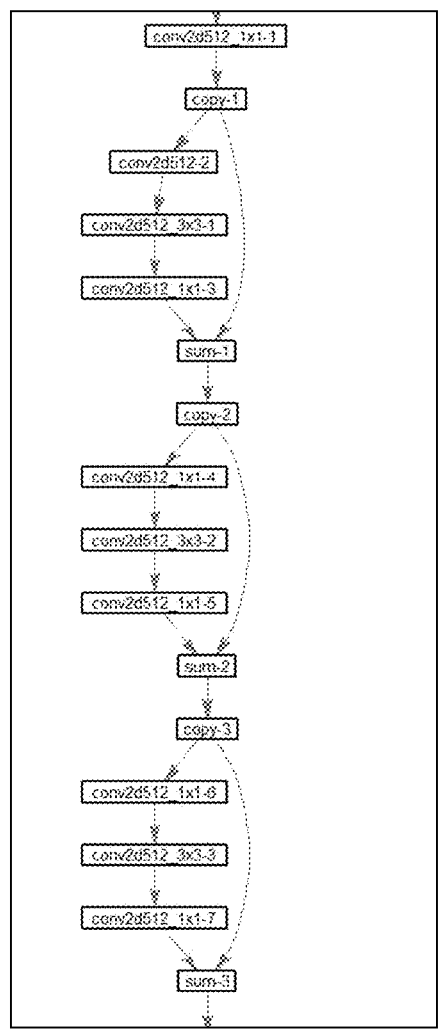
FIG. 9 is a schematic diagram of a 512-channel filter block in a method for extracting an acoustic feature based on a convolution neural network according to an embodiment of the present disclosure.
FIG. 10 is a flow chart of a method for extracting an acoustic feature based on a convolution neural network according to still yet another embodiment of the present disclosure.

FIG. 9 is a schematic diagram of a 512-channel filter block in a method for extracting an acoustic feature based on a convolution neural network according to an embodiment of the present disclosure. In FIG. 9, "copy" means copying an input into several copies, and "sum" means summing the input together.

Conv512_1×1 is a convolution layer with kernelsize=1×1 and filters=512, and Conv512_3×3 is a convolution layer with kernalsize=3×3 and filters=512.

FIG. 10 is a flow chart of a method for extracting an acoustic feature based on a convolution neural network according to yet another embodiment of the present disclosure. As illustrated in FIG. 10, in an embodiment illustrated in FIG. 1, the block 102 can be implemented as block 1001.

In block 1001, the speech spectrogram with the predetermined dimension number is recognized by a jump link structure of the convolution neural network to obtain the acoustic feature of the speech to be recognized.

Figure 11:
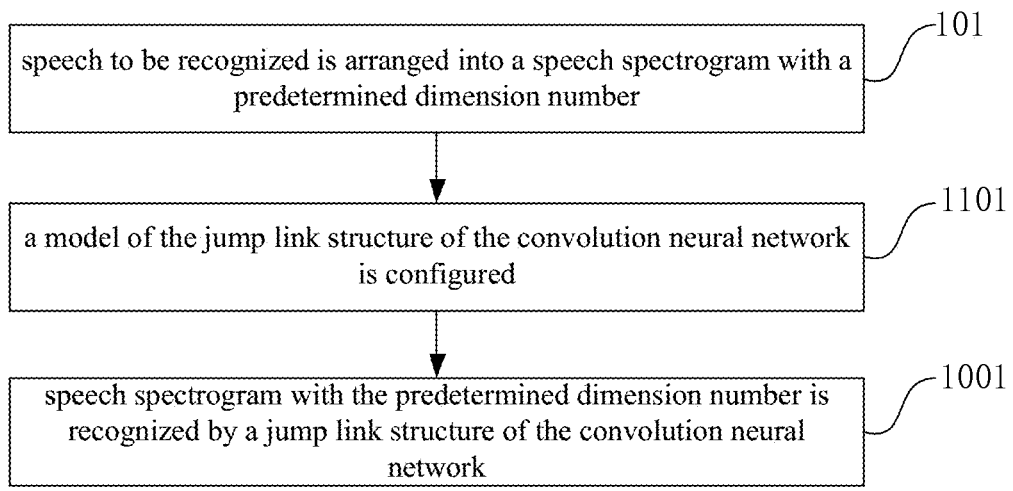
FIG. 11 is a flow chart of a method for extracting an acoustic feature based on a convolution neural network according to still yet another embodiment of the present disclosure.

FIG. 11 is a flow chart of a method for extracting an acoustic feature based on a convolution neural network according to yet another embodiment of the present disclosure. As illustrated in FIG. 11, in an embodiment illustrated in FIG. 10, before the block 1001, the method further includes block 1101.

In block 1101, a model of the jump link structure of the convolution neural network is configured.

Figure 12:
FIG. 12 is a schematic diagram of a configuration of a model of a jump link structure in a method for extracting an acoustic feature based on a convolution neural network according to an embodiment of the present disclosure.

In this embodiment, a configuration of the model of the jump link structure of the convolution neural network can be illustrated in FIG. 12. FIG. 12 is a schematic diagram of a configuration of a model of a jump link structure in a method for extracting an acoustic feature based on a convolution neural network according to an embodiment of the present disclosure.

Specifically, for a 64-channel filter block consisting of a convolution directed acycline graph (DAG for short) of a 64-channel filter bank (filters=64), the down-sampling is performed by the pooling layer both in a time domain and in a frequency domain.

For a 128-channel filter block consisting of a convolution DAG of a 128-channel filter bank (filters=128), the down-sampling is performed by the pooling layer both in the time domain and in the frequency domain.

For a 256-channel filter block consisting of a convolution DAG of a 256-channel filter bank (filters=256), the down-sampling is performed by the pooling layer in the frequency domain.

For a 512-channel filter block consisting of a convolution DAG of a 512-channel filter bank (filters=512), the down-sampling is performed by the pooling layer in the frequency domain.

In the embodiment, the down-sampling performed by the pooling layer in the time domain is ½ down sampling, and the down-sampling performed by the pooling layer in the frequency domain is also ½ down sampling.

Figure 13:
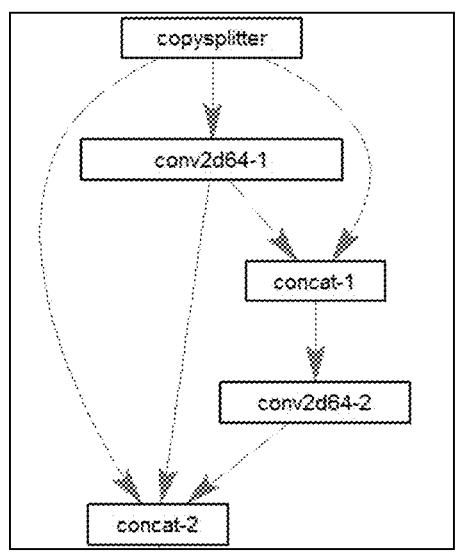
FIG. 13 is a schematic diagram of a 64-channel filter block in a method for extracting an acoustic feature based on a convolution neural network according to another embodiment of the present disclosure.

FIG. 13 is a schematic diagram of a 64-channel filter block in a method for extracting an acoustic feature based on a convolution neural network according to another embodiment of the present disclosure. In FIG. 13, "copysplitter" means copying the input into several copies, and "concat" means concatenating the input together.

Conv2d64_3×3 is the convolution layer with kernalsize=3×3 and filters=64, in which, kernalsize is a convolution kernel, filters are the filter banks.

Figure 14:
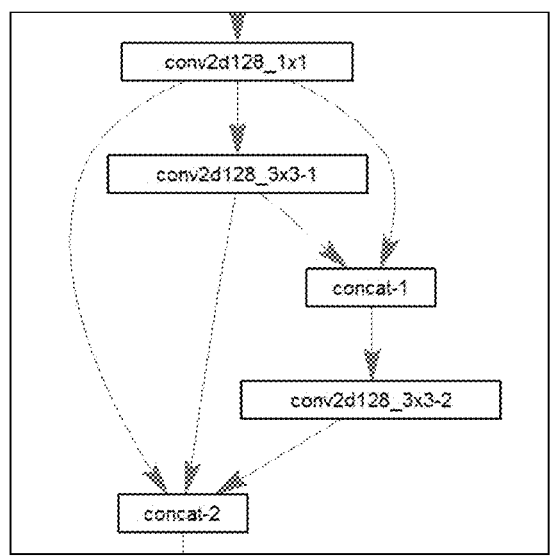
FIG. 14 is a schematic diagram of a 128-channel filter block in a method for extracting an acoustic feature based on a convolution neural network according to another embodiment of the present disclosure.

FIG. 14 is a schematic diagram of a 128-channel filter block in a method for extracting an acoustic feature based on a convolution neural network according to another embodiment of the present disclosure. In FIG. 14, "copysplitter" means copying the input into several copies, and "concat" means concatenating the input together.

Conv128_1×1 is the convolution layer with kernelsize=1×1 and filters=128, and Conv128_3×3 is a convolution layer with kernalsize=3×3 and filters=128.

Figure 15:
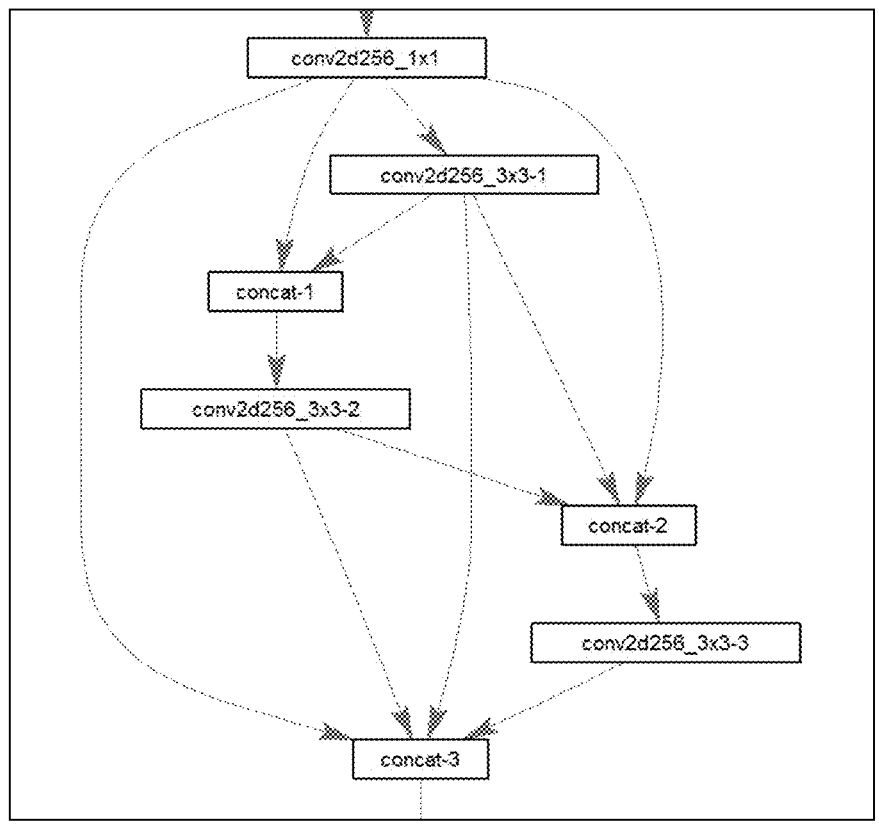
FIG. 15 is a schematic diagram of a 256-channel filter block in a method for extracting an acoustic feature based on a convolution neural network according to another embodiment of the present disclosure.

FIG. 15 is a schematic diagram of a 256-channel filter block in a method for extracting an acoustic feature based on a convolution neural network according to another embodiment of the present disclosure. In FIG. 15, "copysplitter"

means copying the input into several copies, and "concat" means concatenating the input together.

Conv256_1×1 is the convolution layer with kernel-size=1×1 and filters=256, and Conv256_3×3 is a convolution layer with kernalsize=3×3 and filters=256.

Figure 16:
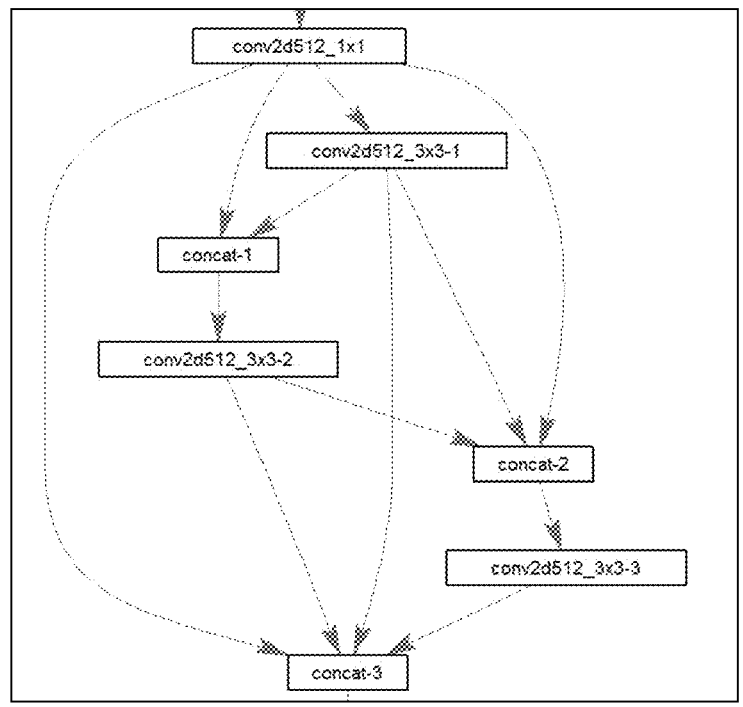
FIG. 16 is a schematic diagram of a 512-channel filter block in a method for extracting an acoustic feature based on a convolution neural network according to another embodiment of the present disclosure.

FIG. 16 is a schematic diagram of a 512-channel filter block in a method for extracting an acoustic feature based on a convolution neural network according to another embodiment of the present disclosure. In FIG. 16, "copysplitter" means copying the input into several copies, and "concat" means concatenating the input together.

Conv512_1×1 is the convolution layer with kernel-size=1×1 and filters=512, and Conv512_3×3 is a convolution layer with kernalsize=3×3 and filters=512.

It should be noted that in the present disclosure, in the pooling layer, 4 times of pooling are used to do the down-sampling in inception structure, but times of the down-sampling in the time domain is less than the times of the down-sampling in the frequency domain. For example, in an embodiment of the present disclosure, the down-sampling is performed 2 times in the time domain and is ¼ in total, and the down-sampling is performed 4 times in the time domain and is ¹/₁₆ in total. This is because a frame shift is usually 10 ms in the speech recognition (that is, a sampling period is 10 ms). Therefore, after the down-sampling in the time domain, the sampling period will become large, for example, the sampling period will become to 40 ms in the structure of the present disclosure. Therefore, the times of down-sampling is related to a granularity of a final classification of a speech model. For example, in the acoustic model with phoneme as a modeling unit, a total of ¼ down-sampling in the time domain is appropriate, and in the acoustic model with a word as the modeling unit, a total of ⅛ down-sampling in the time domain is appropriate.

The method for extracting the acoustic feature based on the convolution neural network provided by the present disclosure can realize extracting the acoustic feature of the speech by the convolution neural network, such that the acoustic feature of the speech can be well characterized, and the accuracy of speech recognition is improved.

Figure 17:
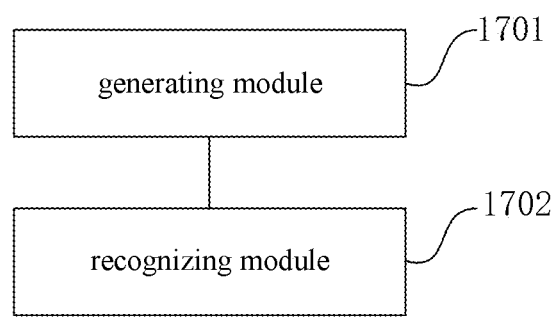
FIG. 17 is a block diagram of a device for extracting an acoustic feature based on a convolution neural network according to an embodiment of the present disclosure.

FIG. 17 is a block diagram of a device for extracting an acoustic feature based on a convolution neural network according to an embodiment of the present disclosure. The device for extracting the acoustic feature based on the convolution neural network according to embodiments of the present disclosure may be a terminal device, or a part of the terminal device to implement the method for extracting the acoustic feature based on the convolution neural network.

The terminal device may be a client device or a server device. The client device may be a smart terminal device such as a smart phone or a tablet computer. The server device may be a speech recognition server or a search engine. In embodiments of the present disclosure, the type of the terminal device is not limited.

As illustrated in FIG. 17, the device for extracting the acoustic feature based on the convolution neural network can include a generating module 1701 and a recognizing module 1702.

The generating module 1701 is configured to arrange speech to be recognized into a speech spectrogram with a predetermined dimension number. In this embodiment, the generating module 1701 is specifically configured to extract a predetermined multidimensional feature vector from the speech to be recognized every predetermined time interval to arrange the speech to be recognized into the speech spectrogram with the predetermined dimension number.

The predetermined dimension number, the predetermined multidimensional value and the predetermined time interval may be set automatically according to an implementation requirement and/or a system performance in a specific implementation, and may not be limited in embodiments of the present disclosure.

For example, in order to use a 2 dimension convolution operation, the speech to be recognized is arranged into a 2 dimension image format first. Take a 40-dimensional filter bank feature (which is commonly used in speech recognition) as an example, a 40-dimensional feature vector is extracted every 10 ms, and then the speech to be recognized can be arranged into the speech spectrogram, as illustrated in FIG. 2. In FIG. 2, the lateral axis represents time, and the vertical axis represents frequency point.

In the embodiment, the predetermined dimension number is 2, the predetermined multidimensional value is 40, and the predetermined time interval is 10 ms.

The recognizing module 1702 is configured to recognize the speech spectrogram with the predetermined dimension number generated by the generating module 1701 by the convolution neural network to obtain the acoustic feature of the speech to be recognized.

In the device for extracting the acoustic feature based on the convolution neural network, the generating module 1701 arranges the speech to be recognized into the speech spectrogram with the predetermined dimension number, and then the recognizing module 1702 recognizes the speech spectrogram with the predetermined dimension number by the convolution neural network to obtain the acoustic feature of the speech to be recognized, thereby realizing extracting the acoustic feature of the speech by the convolution neural network, characterizing the acoustic feature of the speech well, and improving an accuracy of speech recognition.

Figure 18:
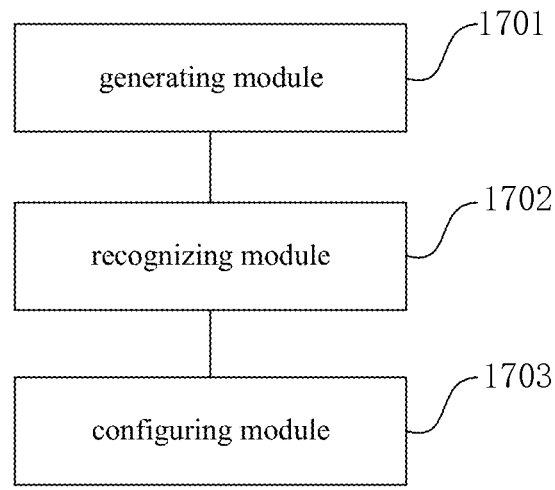
FIG. 18 is a block diagram of a device for extracting an acoustic feature based on a convolution neural network according to another embodiment of the present disclosure.

FIG. 18 is a block diagram of a device for extracting an acoustic feature based on a convolution neural network according to another embodiment of the present disclosure. In an implementation of the present embodiment, the recognizing module 1702 is specifically configured to recognize the speech spectrogram with the predetermined dimension number by a residual network structure of the convolution neural network.

As illustrated in FIG. 18, the device for extracting the acoustic feature based on the convolution neural network can further include a configuring module 1703. The configuring module 1703 is configured to, configure a model of the residual network structure of the convolution neural network before the recognizing module 1702 recognizes the speech spectrogram with the predetermined dimension number.

In this embodiment, a configuration of the model of the residual network structure of the convolution neural network can be illustrated in FIG. 5.

Specifically, the configuring module 1703 is specifically configured to, for a 64-channel filter block consisting of a convolution DAG of a 64-channel filter bank (filters=64), perform a down-sampling by a pooling layer both in a time domain and in a frequency domain; for a 128-channel filter block consisting of a convolution DAG of a 128-channel filter bank (filters=128), perform the down-sampling by the pooling layer both in the time domain and in the frequency domain; for a 256-channel filter block consisting of a convolution DAG of a 256-channel filter bank (filters=256), perform the down-sampling by the pooling layer in the frequency domain; and for a 512-channel filter block consisting of a convolution DAG of a 512-channel filter bank (filters=512), perform the down-sampling by the pooling layer in the frequency domain.

In this embodiment, the down-sampling performed by the pooling layer in the time domain is ½ down sampling, and the down-sampling performed by the pooling layer in the frequency domain is also ½ down sampling.

In this embodiment, a schematic diagram of a 64-channel filter block of an embodiment can be as illustrated in FIG. 6. In FIG. 6, "copy" means copying an input into several copies, and "sum" means summing the input together.

Conv2d64_1×1 is a convolution layer with kernelsize=1×1 and filters=64, and Conv2d64_3×3 is a convolution layer with kernalsize=3×3 and filters=64, in which, kernalsize is a convolution kernel, filters are the filter banks.

In this embodiment, a schematic diagram of a 128-channel filter block of an embodiment can be as illustrated in FIG. 7. In FIG. 7, "copy" means copying the input into several copies, and "sum" means summing the input together.

Conv128_1×1 is a convolution layer with kernelsize=1×1 and filters=128, and Conv128_3×3 is a convolution layer with kernalsize=3×3 and filters=128.

In this embodiment, a schematic diagram of a 256-channel filter block of an embodiment can be as illustrated in FIG. 8, In FIG. 8, "copy" means copying the input into several copies, and "sum" means summing the input together.

Conv256_1×1 is a convolution layer with kernelsize=1×1 and filters=256, and Conv256_3×3 is a convolution layer with kernalsize=3×3 and filters=256.

In this embodiment, a schematic diagram of a 512-channel filter block of an embodiment can be as illustrated in FIG. 9. In FIG. 9, "copy" means copying the input into several copies, and "sum" means summing the input together.

Conv512_1×1 is a convolution layer with kernelsize=1×1 and filters=512, and Conv512_3×3 is a convolution layer with kernalsize=3×3 and filters=512.

In another implementation of the present embodiment, the recognizing module 1702 is specifically configured to recognize the speech spectrogram with the predetermined dimension number by a jump link structure of the convolution neural network.

In addition, the device for extracting the acoustic feature based on the convolution neural network can further include a configuring module 1703. The configuring module 1703 is configured to configure a model of the jump link structure of the convolution neural network before the recognizing module 1702 recognizes the speech spectrogram with predetermined dimension number.

In this embodiment, a configuration of the model of the jump link structure of the convolution neural network can be as illustrated in FIG. 12.

Specifically, the configuring module 1703 is specifically configured to, for a 64-channel filter block consisting of a convolution DAG of a 64-channel filter bank (filters=64), perform a down-sampling by a pooling layer both in a time domain and in a frequency domain; for a 128-channel filter block consisting of a convolution DAG of a 128-channel filter bank (filters=128), perform the down-sampling by the pooling layer both in the time domain and in the frequency domain; for a 256-channel filter block consisting of a convolution DAG of a 256-channel filter bank (filters=256), perform the down-sampling by the pooling layer in the frequency domain; and for a 512-channel filter block consisting of a convolution DAG of a 512-channel filter bank (filters=512), perform the down-sampling by the pooling layer in the frequency domain.

In this embodiment, the down-sampling performed by the pooling layer in the time domain is ½ down sampling, and the down-sampling performed by the pooling layer in the frequency domain is also ½ down sampling.

In this embodiment, a schematic diagram of a 64-channel filter block of another embodiment can be as illustrated in FIG. 13. In FIG. 13, "copysplitter" means copying an input into several copies, and "concat" means concatenating the input together.

Conv2d64_1×1 is a convolution layer with kernelsize=1×1 and filters=64, and Conv2d64_3×3 is a convolution layer with kernalsize=3×3 and filters=64, in which, kernalsize is a convolution kernel, filters are the filter banks.

In this embodiment, a schematic diagram of a 128-channel filter block of another embodiment can be as illustrated in FIG. 14. In FIG. 14, "copysplitter" means copying the input into several copies, and "concat" means concatenating the input together.

Conv128_1×1 is a convolution layer with kernelsize=1×1 and filters=128, and Conv128_3×3 is a convolution layer with kernalsize=3×3 and filters=128.

In this embodiment, a schematic diagram of a 256-channel filter block of another embodiment can be as illustrated in FIG. 15, In FIG. 15, "copysplitter" means copying the input into several copies, and "concat" means concatenating the input together.

Conv256_1×1 is a convolution layer with kernelsize=1×1 and filters=256, and Conv256_3×3 is a convolution layer with kernalsize=3×3 and filters=256.

In an embodiment, a schematic diagram of another embodiment of a 512-channel filter block can be as illustrated in FIG. 16. In FIG. 16, "copysplitter" means copying the input into several copies, and "concat" means concatenating the input together.

Conv512_1×1 is a convolution layer with kernelsize=1×1 and filters=512, and Conv512_3×3 is a convolution layer with kernalsize=3×3 and filters=512.

It should be noted that in the present disclosure, in the pooling layer, 4 times of pooling are used to do the down-sampling in inception structure, but times of the down-sampling in the time domain is less than the times of the down-sampling in the frequency domain. For example, in an embodiment of the present disclosure, the down-sampling is performed 2 times in the time domain and is ¼ in total, and the down-sampling is performed 4 times in the time domain and is 1/16 in total. This is because a frame shift is usually 10 ms in the speech recognition (that is, a sampling period is 10 ms). Therefore, after the down-sampling in the time domain, the sampling period will become large, for example, the sampling period will become to 40 ms in the structure of the present disclosure. Therefore, the times of down-sampling is related to a granularity of a final classification of a speech model. For example, in the acoustic model with phoneme as a modeling unit, a total of ¼ down-sampling in the time domain is appropriate, and in the acoustic model with a word as the modeling unit, a total of ⅛ down-sampling in the time domain is appropriate.

The device for extracting the acoustic feature based on the convolution neural network of the present disclosure can realize extracting the acoustic feature of the speech by the convolution neural network, such that the acoustic feature of the speech can be well characterized, and the accuracy of speech recognition is improved.

Figure 19:
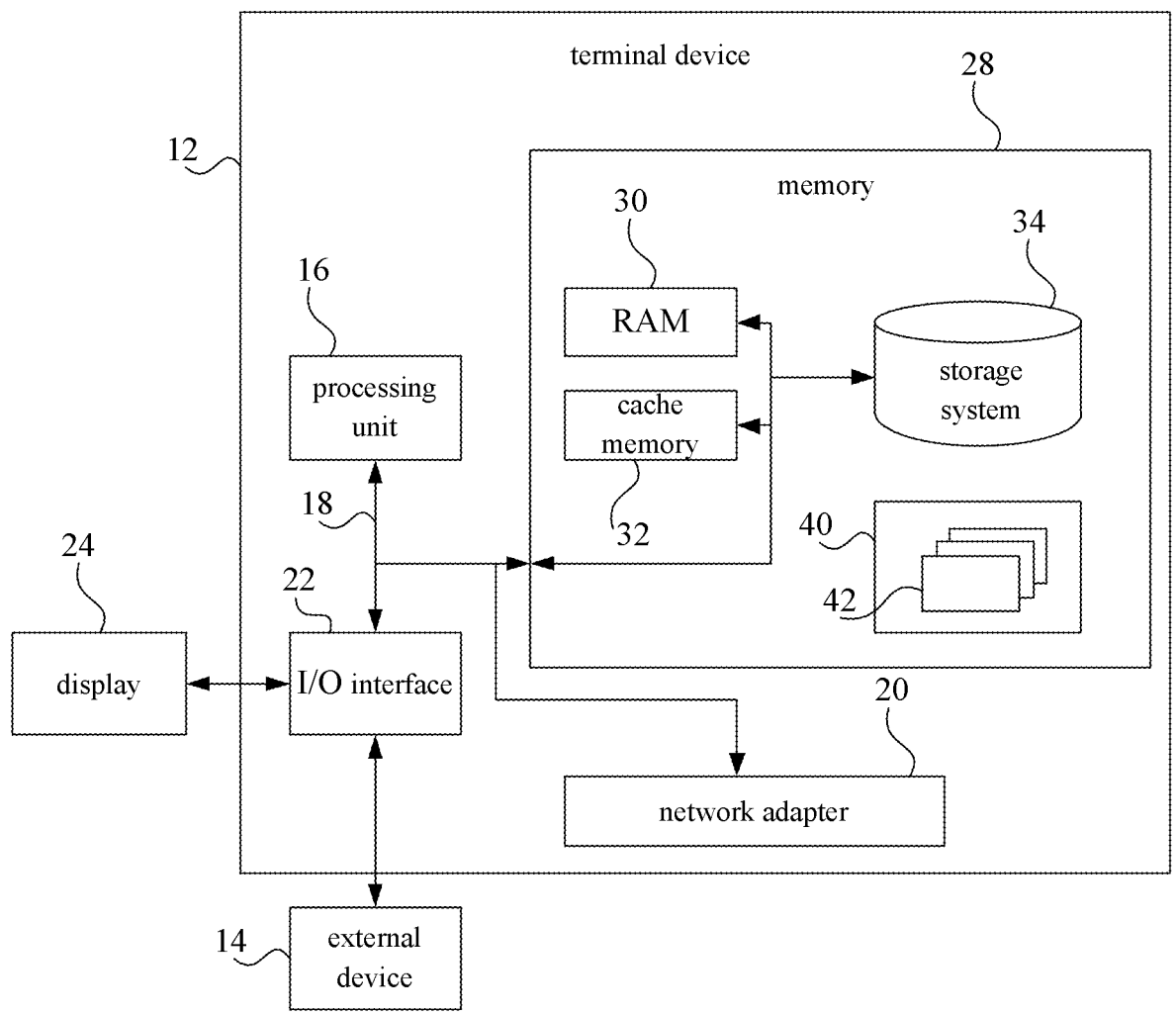
FIG. 19 is a schematic diagram of a terminal device according to an embodiment of the present disclosure.

FIG. 19 is a schematic diagram of a terminal device according to an embodiment of the present disclosure. The terminal device can implement the method for extracting the acoustic feature based on the convolution neural network according to embodiments of the present disclosure.

The terminal device may be a client device or a server device. The client device may be a smart terminal device such as a smart phone or a tablet computer. The server device may be a speech recognition server or a search engine. In embodiments of the present disclosure, the type of the terminal device is not limited.

The terminal device can include one or more processors, and a storage device configured to store one or more programs. When the one or more programs are executed by the one or more processors, the one or more processors execute the method for extracting the acoustic feature based on the convolution neural network provided by the present disclosure.

FIG. 19 illustrates a block diagram of an exemplary terminal device 12 configured to implement embodiments of the present disclosure. The terminal device 12 as illustrated in FIG. 19 is just an example, and should not be construed to limit functions and range of applications of the embodiments of the present disclosure.

As illustrated in FIG. 19, the terminal device 12 is presented in the form of a general-purpose computing device. Components of the terminal device 12 may include, but are not limited to, one or more processors or a processing unit 16, a system memory 28, or a bus 18 connecting to different system components (including the system memory 28 and the processing unit 16).

The bus 18 represents one or more of several types of bus architectures, including a memory bus or a memory controller, a peripheral bus, an accelerated graphics port, a processor, or a local bus using any bus architecture in the several types of bus structures. For example, architectures include, but are not limited to, an industry standard architecture (ISA for short) bus, a micro channel architecture (MAC for short) bus, an enhanced ISA bus, a video electronics standards association (VESA for short) local bus and a peripheral component interconnection (PCI for short) bus.

The terminal device 12 typically includes a variety of computer system readable media. The media may be any available media that can be accessed by the terminal device 12, including a volatile medium and a non-volatile medium, a removable medium and a non-removable medium.

The system memory 28 may include the computer readable memory medium in the form of volatile memory, such as a random access memory (RAM for short) 30 and/or a cache memory 32. The terminal device 12 may further include other removable/non-removable, volatile/non-volatile computer system storage media. For example, a storage system 34 may be used to read and write non-removable and non-volatile magnetic media (which is not illustrated in FIG. 19, and usually refer to as hard disc drive). Although not illustrated in FIG. 19, there may be provided a disk drive capable of reading and writing the removable non-volatile disk (such as software), and an optical disk drive capable of reading and writing a removable non-volatile optical disk (such as compact disc read only memory (CD-ROM for short)), a digital video disc read only memory (DVD-ROM for short), or other optical media. In these cases, each drive may be connected to the bus 18 via one or more data media interfaces. The memory 28 may include at least one program product, the program product has a set of (at least one) program modules, and the program modules are configured to perform functions of embodiments of the present disclosure.

A program/utility 40 having a set of (at least one) program modules 42 may be stored in, for example, the memory 28.

The program module 42 includes, but is not limited to, an operating system, one or more applications, other program modules, and program data, and each or some combination of examples may include implementation of network environment. The program module 42 generally executes the function and/or the method described in embodiments of the present disclosure.

The terminal device 12 may also communicate with one or more external devices 14 (such as a keyboard, a pointing device, and a display 24), may also communicate with one or more devices capable of enabling users to interact with the terminal device 12, and/or any device (such as a network card, a modem) capable of enabling the terminal device 12 to communicate with one or more other computing devices. The communication can be performed via an input/output (I/O) interface 22, and the terminal device 12 may also communicate with one or more networks (such as a local area network (LAN for short), a wide area network (WAN for short), and/or a public network, such as internet) via a network adapter 20. As illustrated in FIG. 19, the network adapter 20 communicates with other modules of the terminal device 12 via the bus 18. It should be understood that although not illustrated in FIG. 19, other hardware and/or software modules may be used combining with the terminal device 12, including but not limited to microcode, device drivers, redundant processing units, external disk drive arrays, redundant arrays of inexpensive disks systems, tape drives, and data backup storage systems.

The processing unit 16 is configured to execute various function applications and data processing by running the program stored in the system memory 28, such as implement the method for extracting the acoustic feature based on the convolution neural network of the present disclosure.

The present disclosure further includes a storage medium comprising computer executable instructions, and the computer executable instructions are configured to execute the method for extracting the acoustic feature based on the convolution neural network of the present disclosure.

The storage medium including the computer executable instructions may adopt any combination of one or more computer readable media. The computer-readable medium may be a computer readable signal medium or a computer-readable storage medium. The computer-readable storage medium may be, but not limited to, systems and devices of electronic, magnetic, optical, electromagnetic, infrared, or semiconductor, or any combination thereof. More specific examples (non-exhaustive list) of the computer-readable storage medium may include an electrical connection having one or more wires, a portable computer disk, a hard disk, a random access memory (RAM for short), a read only memory (ROM for short), an erasable programmable read only memory (EPROM for short), a flash memory, an optical fiber, a portable compact disk read only memory (CD-ROM for short), an optical memory device, a magnetic memory, or any suitable combination of thereof. In the present disclosure, the computer readable storage medium can be any tangible medium that includes or stores programs, the programs may be used by instruction execution systems, devices or combination thereof.

The program code in the computer-readable medium may be transmitted by any suitable medium, including, but not limited to, wireless, wire, cable and radio frequency, or any suitable combination thereof.

Computer program codes of the present disclosure may be written in one or more programming languages or combinations thereof, the programming languages include object-oriented programming languages, such as Java, Smalltalk, and C++, and also include conventional procedural programming languages, such as C languages or similar programming languages. The program code can be entirely executed on computers of users, partially executed on the computers of the users, executed as a separate package, partially executed on computers of the users and partially executed on remote computers, or entirely executed on the remote computers or servers. In cases of remote computers, the remote computers may be connected to computers of users through any kind of network including local area network or wide area network, or may be connected to external computers (such as connected to the internet via internet service providers).

It is to be understood that, in the description of the present disclosure, terms of "first" and "second" are only used for description and cannot be seen as indicating or implying relative importance. Furthermore, unless otherwise explained, it is to be understood that a term of "a plurality of" refers to two or more.

Any process or method described in the flowing diagram or other means may be understood as a module, segment or portion including one or more executable instruction codes of the procedures configured to achieve a certain logic function or process, and the preferred embodiments of the present disclosure include other performances, in which the performance may be achieved in other orders instead of the order shown or discussed, such as in an almost simultaneous way or in an opposite order, which should be appreciated by those having ordinary skills in the art to which embodiments of the present disclosure belong.

It should be understood that, each part of the present disclosure may be implemented by the hardware, software, firmware or the combination thereof. In the above embodiments of the present disclosure, the plurality of procedures or methods may be implemented by the software or hardware stored in the computer memory and executed by the proper code execution system. For example, if the plurality of procedures or methods is to be implemented by the hardware, like in another embodiment of the present disclosure, any one of the following known technologies or the combination thereof may be used, such as discrete logic circuits having logic gates for implementing various logic functions upon an application of one or more data signals, application specific integrated circuits having appropriate logic gates, programmable gate arrays (PGA), field programmable gate arrays (FPGA).

It may be understood by those having the ordinary skills in the related art that all or part of the steps in the method of the above embodiments may be implemented by instructing related hardware via programs, the program may be stored in a computer readable storage medium, and the program includes one step or combinations of the steps of the method when the program is executed.

In addition, individual functional units in the embodiments of the present disclosure may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer readable storage medium. The above-mentioned storage medium may be a read-only memory, a magnetic disc, an optical disc, etc.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in an embodiments," "in some embodiment", "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated that the above embodiments cannot be construed to limit the present disclosure, and changes, alternatives, and modifications may be made in the embodiments without departing from spirit, principles and scope of the present disclosure.

What is claimed is:

1. A method for extracting an acoustic feature based on a convolution neural network, comprising:
    arranging speech to be recognized into a speech spectrogram with a predetermined dimension number; and
    recognizing the speech spectrogram with the predetermined dimension number by the convolution neural network, to obtain the acoustic feature of the speech to be recognized,
    wherein the convolution neural network comprises a structure of one of the following:
        a residual network structure; and
        a jump link structure;
    wherein before recognizing the speech spectrogram with the predetermined dimension number by the convolution neural network, further comprising:
        configuring a model of the structure of the convolution neural network;
    wherein configuring the model of the structure of the convolution neural network comprises:
        for a 64-channel filter block consisting of a convolution directed acycline graph of a 64-channel filter bank, performing a down-sampling by a pooling layer both in a time domain and in a frequency domain;
        for a 128-channel filter block consisting of a convolution directed acycline graph of a 128-channel filter bank, performing the down-sampling by the pooling layer both in the time domain and in the frequency domain;
        for a 256-channel filter block consisting of a convolution directed acycline graph of a 256-channel filter bank, performing the down-sampling by the pooling layer in the frequency domain; and
        for a 512-channel filter block consisting of a convolution directed acycline graph of a 512-channel filter bank, performing the down-sampling by the pooling layer in the frequency domain.

2. The method according to claim 1, wherein arranging speech to be recognized into a speech spectrogram with a predetermined dimension number comprises:
    extracting a predetermined multidimensional feature vector from the speech to be recognized every predetermined time interval to arrange the speech to be recognized into the speech spectrogram with the predetermined dimension number.

3. A device for extracting an acoustic feature based on a convolution neural network, comprising:
    one or more processors;

a memory, configured to store one or more program modules executable by the one or more processors, wherein the one or more program modules comprise:
  a generating module, configured to arrange speech to be recognized into a speech spectrogram with a predetermined dimension number; and
  a recognizing module, configured to recognize the speech spectrogram with the predetermined dimension number by the convolution neural network to obtain the acoustic feature of the speech to be recognized,
wherein the convolution neural network comprises a structure of one of the following:
  a residual network structure; and
  a jump link structure;
wherein the one or more program modules further comprise:
  a configuring module, configured to configure a model of the structure of the convolution neural network before the recognizing module recognizes the speech spectrogram with the predetermined dimension number;
wherein, the configuring module is configured to:
  for a 64-channel filter block consisting of a convolution directed acycline graph of a 64-channel filter bank, perform a down-sampling by a pooling layer both in a time domain and in a frequency domain;
  for a 128-channel filter block consisting of a convolution directed acycline graph of a 128-channel filter bank, perform the down-sampling by the pooling layer both in the time domain and in the frequency domain;
  for a 256-channel filter block consisting of a convolution directed acycline graph of a 256-channel filter bank, perform the down-sampling by the pooling layer in the frequency domain; and
  for a 512-channel filter block consisting of a convolution directed acycline graph of a 512-channel filter bank, perform the down-sampling by the pooling layer in the frequency domain.

4. The device according to claim 3, wherein,
the generating module is configured to extract a predetermined multidimensional feature vector from the speech to be recognized every predetermined time interval to arrange the speech to be recognized into the speech spectrogram with the predetermined dimension number.

5. A non-transitory computer readable storage medium comprising computer executable instructions configured to perform a method for extracting an acoustic feature based on a convolution neural network when executed by a computer processor, the method comprising:
  arranging speech to be recognized into a speech spectrogram with a predetermined dimension number; and
  recognizing the speech spectrogram with the predetermined dimension number by the convolution neural network, to obtain the acoustic feature of the speech to be recognized,
wherein the convolution neural network comprises a structure of one of the following:
  a residual network structure; and
  a jump link structure;
wherein before recognizing the speech spectrogram with the predetermined dimension number by the convolution neural network, further comprising:
  configuring a model of the structure of the convolution neural network;
wherein configuring the model of the structure of the convolution neural network comprises:
  for a 64-channel filter block consisting of a convolution directed acycline graph of a 64-channel filter bank, performing a down-sampling by a pooling layer both in a time domain and in a frequency domain;
  for a 128-channel filter block consisting of a convolution directed acycline graph of a 128-channel filter bank, performing the down-sampling by the pooling layer both in the time domain and in the frequency domain;
  for a 256-channel filter block consisting of a convolution directed acycline graph of a 256-channel filter bank, performing the down-sampling by the pooling layer in the frequency domain; and
  for a 512-channel filter block consisting of a convolution directed acycline graph of a 512-channel filter bank, performing the down-sampling by the pooling layer in the frequency domain.

* * * * *

UNITED STATES PATENT AND TRADEMARK OFFICE
CERTIFICATE OF CORRECTION

PATENT NO. : 10,621,972 B2
APPLICATION NO. : 15/914066
DATED : April 14, 2020
INVENTOR(S) : Li et al.

It is certified that error appears in the above-identified patent and that said Letters Patent is hereby corrected as shown below:

On the Title Page

Item (54), the Title should read:
--(54)  METHOD AND DEVICE FOR EXTRACTING ACOUSTIC FEATURE BASED ON CONVOLUTION NEURAL NETWORK AND TERMINAL DEVICE--

Signed and Sealed this
Twenty-first Day of July, 2020

Andrei Iancu
*Director of the United States Patent and Trademark Office*